(12) United States Patent
Gluck et al.

(10) Patent No.: US 9,372,849 B2
(45) Date of Patent: Jun. 21, 2016

(54) DYNAMIC HIGHLIGHTING OF REPETITIONS IN ELECTRONIC DOCUMENTS

(71) Applicant: International Business Machines Corporation, Armonk, NY (US)

(72) Inventors: Olympia Gluck, Haifa (IL); Itzhack Goldberg, Hadera (IL); Gilad Sharaby, Alon Hagalil (IL); Neil Sondhi, Budapest (HU)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/972,134

(22) Filed: Dec. 17, 2015

(65) Prior Publication Data

US 2016/0092433 A1    Mar. 31, 2016

Related U.S. Application Data

(63) Continuation of application No. 14/452,781, filed on Aug. 6, 2014.

(51) Int. Cl.
| | |
|---|---|
| *G06F 17/21* | (2006.01) |
| *G06F 17/24* | (2006.01) |
| *G06F 17/27* | (2006.01) |
| *G06K 9/00* | (2006.01) |

(52) U.S. Cl.
CPC .............. *G06F 17/277* (2013.01); *G06F 17/24* (2013.01); *G06K 9/00469* (2013.01)

(58) Field of Classification Search
CPC . G06F 17/211; G06F 3/0601; G06F 17/2288; G06F 3/04842
See application file for complete search history.

(56) References Cited

U.S. PATENT DOCUMENTS

| | | | | | |
|---|---|---|---|---|---|
| 2,337,534 | A | * | 12/1943 | Barber | ................. G01J 1/14 346/107.1 |
| 5,819,260 | A | * | 10/1998 | Lu | ................. G06F 17/3061 707/700 |

(Continued)

OTHER PUBLICATIONS

Alter, Alexandra, "Your E-Book is Reading You", Updated Jul. 19, 2012, Copyright (c) 2014 Dow Jones & company, Inc., p. 1-6, <http://online.wsj.com/article/SB10001424052702304870304577490950051438304.html>.

(Continued)

*Primary Examiner* — Scott Baderman
*Assistant Examiner* — Mario M Velez-Lopez
(74) *Attorney, Agent, or Firm* — Daniel R. Simek

(57) ABSTRACT

In a method for dynamically highlighting repetitive text in electronic documents, obtaining one or more user preferences related to a user reading an electronic document. The method further includes determining whether the electronic document contains one or more repetitive text associations, wherein a repetitive text association is data that provides one or more indications of repetitive text segments interspersed within a document. In response to determining that the electronic document contains one or more repetitive text associations, the method further includes identifying one or more repetitive text segments in the electronic document corresponding to the one or more repetitive text associations and determining a time duration expended by the user reading an instance of the identified one or more repetitive text segments within the electronic document. The method further includes highlighting the identified one or more repetitive text segments within the electronic document based one or more obtained user preferences.

1 Claim, 4 Drawing Sheets

(56) References Cited

U.S. PATENT DOCUMENTS

| | | | | |
|---|---|---|---|---|
| 6,409,513 | B1* | 6/2002 | Kawamura | G09B 17/04 434/178 |
| 6,561,812 | B1* | 5/2003 | Burmester | G09B 7/02 434/307 R |
| 6,869,287 | B1* | 3/2005 | Tadlock | G09B 17/00 434/178 |
| 6,968,332 | B1* | 11/2005 | Milic-Frayling | G06F 17/30867 707/723 |
| 6,978,419 | B1* | 12/2005 | Kantrowitz | G06F 17/30687 707/E17.079 |
| 8,260,915 | B1* | 9/2012 | Ashear | H04L 43/04 709/224 |
| 8,564,660 | B2* | 10/2013 | Weatherhead | H04H 60/45 348/135 |
| 8,577,155 | B2* | 11/2013 | Wu | G06F 17/30985 382/168 |
| 8,750,624 | B2* | 6/2014 | Kletter | G06K 9/00483 382/209 |
| 8,898,595 | B2* | 11/2014 | Cragun | G06F 17/30716 715/821 |
| 8,996,524 | B2* | 3/2015 | Chaturvedi | G06Q 30/02 707/737 |
| 9,069,332 | B1* | 6/2015 | Gayles | G04F 10/00 |
| 9,123,053 | B2* | 9/2015 | Murray | |
| 2006/0136821 | A1* | 6/2006 | Barabe | G06F 17/2288 715/205 |
| 2007/0130516 | A1* | 6/2007 | Goffin | G06F 17/212 715/243 |
| 2007/0214381 | A1* | 9/2007 | Goyal | G06F 11/0715 714/5.1 |
| 2007/0234209 | A1* | 10/2007 | Williams | G06F 3/04842 715/700 |
| 2007/0292826 | A1* | 12/2007 | Goddy | G09B 19/00 434/156 |
| 2008/0096171 | A1* | 4/2008 | Movahhedi | G09B 19/00 434/178 |
| 2008/0108029 | A1* | 5/2008 | Luke | G09B 5/00 434/178 |
| 2008/0189608 | A1* | 8/2008 | Nurmi | G06F 17/241 715/273 |
| 2008/0244381 | A1 | 10/2008 | Nicolaou et al. | |
| 2011/0050594 | A1* | 3/2011 | Kim | G06F 3/04847 345/173 |
| 2012/0078612 | A1* | 3/2012 | Kandekar | G06F 17/2745 704/9 |
| 2012/0206472 | A1* | 8/2012 | Kandekar | G06Q 30/0214 345/581 |
| 2012/0317244 | A1* | 12/2012 | Liang | H04L 67/02 709/219 |
| 2012/0320416 | A1* | 12/2012 | Mbenkum | G06F 17/30884 358/1.15 |
| 2014/0164593 | A1* | 6/2014 | Murray | G06Q 30/02 709/224 |
| 2015/0355805 | A1* | 12/2015 | Chandler | G06F 3/04817 715/784 |
| 2015/0356583 | A1* | 12/2015 | Sheppard | G06Q 10/06 705/7.34 |

OTHER PUBLICATIONS

Manjoo, Farhad, "You Won't Finish This Article", The Slate Group, <http://www.slate.com/articles/technology/technology/2013/06/how_people_read_online_why_you_won_t_finish_this_article.2.html>.

Moritz, Amanda, "Repetition is the mother of all learning", Brainscape, Copyright (c) Bold Learning Solutions, May 16, 2014, <http://blog.brainscape.com/2011/05/repetition-learning/>.

Pashler, et al., "Enhancing learning and retarding forgetting: Choices and consequences", Psychonomic Bulletin & Review 2007, 14(2), 187-193, Copyright 2007 Psychonomic Society, Inc., <http://laplab.ucsd.edu/articles/Pashler.Rohrer.Cepeda.Carpenter_2007.pdf>.

"Memsource Editor User Manual", From Memsource, page last modified Apr. 10, 2014, <http://wiki.memsource.com/wiki/MemSource_Editor_User_Manual>.

List of IBM Patents or Patent Applications Treated as Related, Appendix P, Filed Herewith, 2 pages.

Olympia Gluck, et al., "Dynamic Highlighting of Repetitions in Electronic Documents", U.S. Appl. No. 14/452,781, filed Aug. 6, 2014.

* cited by examiner

DYNAMIC HIGHLIGHTING OF REPETITIONS IN ELECTRONIC DOCUMENTS

BACKGROUND OF THE INVENTION

The present invention relates generally to the field of software, and more particularly to document applications on computerized devices.

Reading electronic documents has become as ubiquitous as electronic devices themselves. As computer technology evolves and more printed content becomes available in electronic formats, more people are reading documents obtained from the Internet, and publishers are offering an increased number of electronic documents. In addition, as the cost of producing CD's, DVD's, and e-publishing has dropped, and the ease of use and the availability of smaller, mobile electronic devices has increased, people's reading habits have changed. Users that once only had access to the Internet through desktop and laptop computers can now access electronic documents via smartphones, tablet computers, wearable devices, and dedicated e-Book readers. Touch screens and gyroscopic sensors on tablet computers, smartphones, and other electronic device have reduced or virtually eliminated the need for a discreet mouse and keyboard. Gaze tracking and voice recognition capabilities can convert many of these electronic device to hands-free use. E-Book readers themselves have transformed from black & white or monochrome screen book replacements to full-color, multimedia electronic devices capable of supporting computer applications as well as displaying e-Books and other electronic documents.

From a publishers perspective, documents that are expensive to produce, limited to niche markets, or suffered from the content becoming quickly outdated, such as textbooks and training manuals, are prime candidates for being supplied as electronic documents. Users of electronic devices expect rapid responses to their needs as well as a high level of convenience. Different users may have differing reading styles. One user chooses to skim an electronic document quickly, jumping around looking for items of interest. Another user chooses to read systematically, devoting more time to locate information used in differing contexts. Electronic documents, electronic document readers, and electronic document presentation software provide the user a variety of capabilities and improved collaboration tools.

SUMMARY

Aspects of the present invention disclose a method, a computer program product, and a system for dynamically highlighting repetitive text in electronic documents. The method includes one or more processors obtaining one or more user preferences related to a user reading an electronic document. The method further includes one or more processors determining whether the electronic document contains one or more repetitive text associations, wherein a repetitive text association is data that provides one or more indications of repetitive text segments interspersed within a document. In response to determining that the electronic document contains one or more repetitive text associations, the method further includes one or more processors identifying one or more repetitive text segments in the electronic document corresponding to the one or more repetitive text associations. The method further includes one or more processors determining a time duration expended by the user reading an instance of the identified one or more repetitive text segments within the electronic document. The method further includes one or more processors highlighting the identified one or more repetitive text segments within the electronic document based on one or more obtained user preferences.

DETAILED DESCRIPTION

Figure 1:
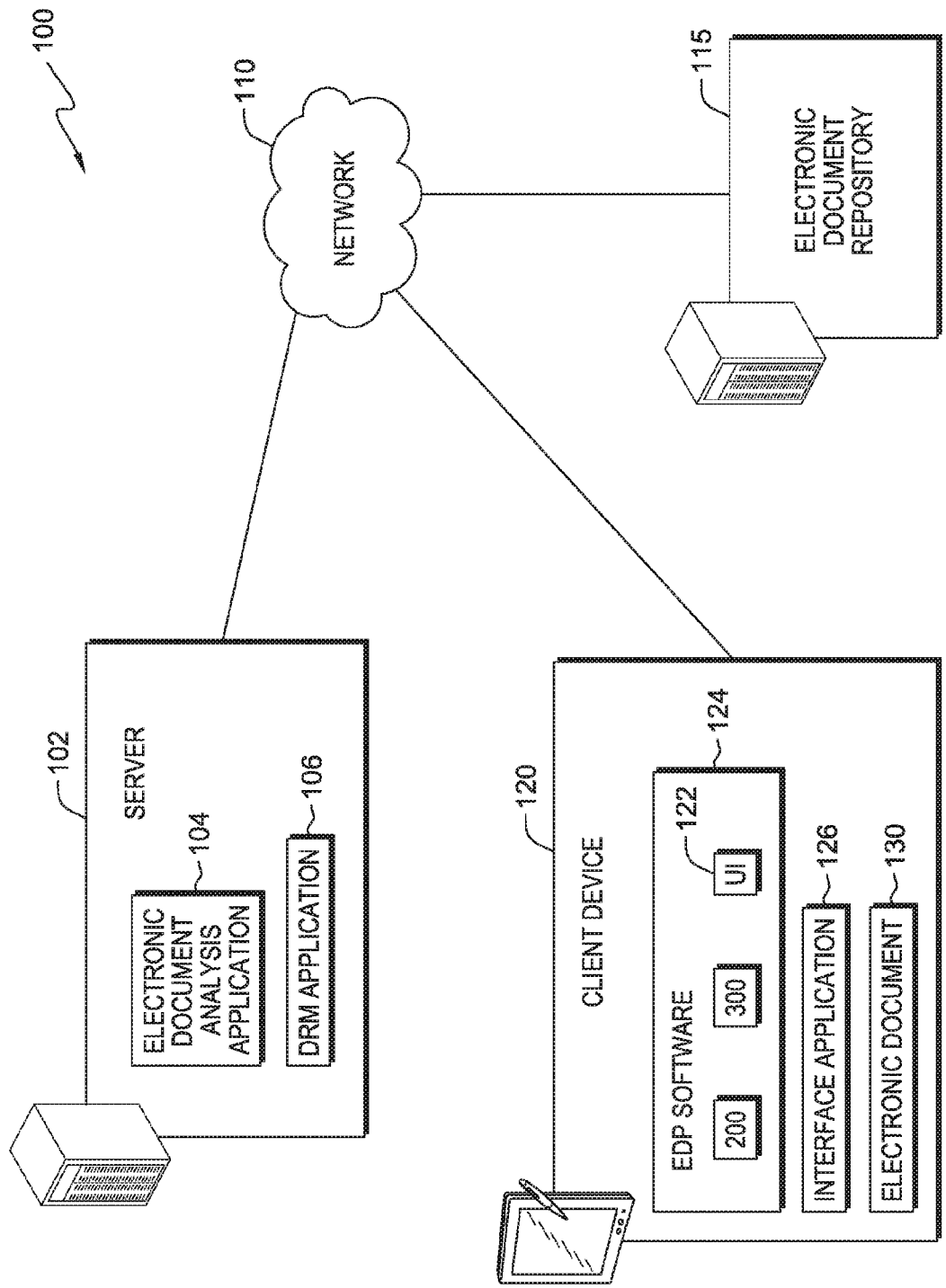
FIG. 1 is a functional block diagram illustrating a distributed computing environment, in accordance with an embodiment of the present.

Reading electronic documents is a commonplace event. Originally, electronics documents were "flat" text only files containing only a single font. "Rich text" editors allow for more variations in electronic documents, which include spell checking, multiple fonts, and bold/italic/underline attributes applied to any character in the electronic document. More advanced text editors allow the user to check grammar, embed pictures and sounds, provide styles/watermarks, utilize enhanced printing options, and add hyperlinks. The common thread within these electronic documents was that a page had a fixed length and width, and the controls for the fonts, colors, and special effects were hardwired within the electronic document. If the page being read did not fit in the field of view, the user was provided scroll bars to move the text around within the available field of view.

E-Books and newer formats of electronic documents, including some styles of webpages, are designed around "reflowable" content. A reflowable document is a type of electronic document that can adapt its presentation to the output device. The number of pages in an e-Book varies by the size of the display area within which the e-Book is read, and the font size chosen by a user. For example, if an e-Book is read using the native application on an e-Reader, the e-Book appears to have a different number of pages than the same e-Book presented using a plug-in for a web browser on the same e-Reader. The web browser's interface may reduce the available viewing area, and the web browser may display the text in a different font.

As will be appreciated by one skilled in the art, aspects of the present invention may evolve as technology changes. As electronic devices shrink and become more sophisticated, so do the presentation methods and the manners in which the user may interact with the electronic device. For example, desktop computers with discreet devices such as a monitor, a keyboard, and a mouse are being supplanted by wearable devices controlled by gaze tracking for some applications. Virtual reality gloves and headsets can transform learning from what was once a flat black-and-white page into an immersive 3-D experience. In a further example, speech recognition and digital avatars with electronic voice synthesis, a user can verbally control an electronic device and it can respond in kind. Each of these technologies enables the user to consume the content of e-books and other electronic documents in various ways and control the interactions with e-books and other electronic documents.

E-Books and other electronic documents can take advantage of an old Latin motto "Repetito mater studiorum est"— "Repetition is the mother of all learning". E-Books and other electronic documents may more readily implement repetitions to aid the user in learning subject matter because e-Books are less constrained by size, cost, and weight; limitations that affect a physical document or book.

Embodiments of the present invention recognize that some users benefit from repetitions in a document while other users are slowed down by the repetitive content. One user viewing a document may want the ability to keep track of the portions of a document that have been read. Additionally, a user may also want to note content that required extra time and concentration to grasp or locate content used in differing contexts. Embodiments of the present invention may be implemented in versions of the native e-Reader software, in electronic document presentation software (herein identified as EDP software), in a unique downloadable app (application), etc. In an example embodiment, a user's preferences are set to: reading time trigger is "running average of three repetitions", dynamic highlighting is "enabled and reversed", highlighting style is "fill vertically", reading mode is "non-linear", and remember user is "yes". As the user jumps around the document in non-linear reading mode, the EDP software starts identifying the repetitions with colored underlines and averages the reading time duration of the actual instances read rather than starting with the first three instances in the electronic document. In an embodiment, the EDP software monitors the users reading by identifying page "scrolls" (e.g., via stylus, touch screen, key strokes, etc.). As the time spent reading repetitive text segments decreases, the underline becomes a gradient of color as one threshold is reached. When the final reading time duration threshold is reached, or the average reading time duration remains constant within a tolerance, the highlighting becomes a solid, colored area. By setting the preference of remember user to "yes", the EDP software starts the highlighting level where the user stopped reading. A further embodiment to the aspects of "reading time monitoring" and "remember user" is to time stamp the electronic document (e.g., by section, date started, date completed, etc.). This is useful information because a human can have imperfect information retention. A human obtains information in "degrees of learning" and loses information via "rates of forgetting". EDP software can activate a "retention degradation" feature. For example, the EDP software can compare the current date to when the user last read the electronic document and determine if sufficient time has elapsed to reset the highlighting status as the user was reading a new e-Book or apply a percentage change to the highlighting levels based on the time span.

In an alternate embodiment, a user may want to preview specific repetitive text segments via a hyperlink function to see if the repetitive text segments are presented in the same context or different contexts. For example, a user with an e-Reader capable of rendering the electronic document in color may assign different colors to different groups of repetitive text segments. Furthermore, the user may change preferences for the colors assigned to repetitive text segments that appear in different contexts (e.g., constant highlighting vs. dynamic highlighting, full paragraph vs. single sentence, instance number as a superscript or subscript number at the beginning of the highlighted area, a form of annotation, etc.). The user may change the effects related to highlighting based on the capability of the user's e-Reader. If a user's e-Reader displays in a black-and-white or monochrome mode, the highlighting response may be reverse tone text and may include a superscript or subscript identification (e.g., count number). For example, the superscript or subscript number can signify the number of repetitions that have been read (e.g., the higher the number, the faster the user can skim) or how quickly the user is reading in seconds. It should be noted that a subscript identification may be preferable to a superscript designation to avoid confusion within electronic documents that contain footnotes.

In another embodiment, a plurality of users are operating in a collaborative fashion. Each user focuses on their assigned sections of an electronic document (e.g., a training manual), and each user seeks to master their assigned sections. Knowing which content each user is focusing on and having a visual indication as to how quickly each user is learning their respective sections based on reviewing the dynamic highlighting of repetitive text segments with the content is useful. For example, the users may identify the area of content highlighted, including the repetitive text, to be a paragraph and each user has a designated color. In this example, the e-Reader is a shared physical device, which may store individual user profiles containing a list of electronic documents each user has read, user preferences for each electronic document, reading time duration information for each electronic document, etc. In a different example, the electronic document and the user profiles are stored on a server controlling an intranet, which each user accesses, with reading time duration information updated periodically.

The present invention will now be described in detail with reference to the Figures. FIG. 1 is a functional block diagram illustrating distributed data processing environment 100, in accordance with one embodiment of the present invention. An embodiment of distributed data processing environment 100 includes server 102, client device 120, and electronic document repository 115, all interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server computer 102 represents a computer system utilizing clustered computers and components (e.g., database server computers, application server computers, etc.) that act as a single pool of seamless resources when accessed through network 110, as is common in data centers and with cloud computing applications. In general, server 102 is representative of any programmable electronic device or combination of programmable electronic devices capable of executing machine readable program instructions and communicating with client computers, such as client device 120 via network 110. Server 102 may include components as depicted and described in further detail with respect to FIG. 4, in accordance with embodiments of the present invention.

Server 102 includes electronic document analysis application 104, digital rights management (DRM) application 106, and other data resources (not shown). Electronic document analysis application 104 scans electronic documents for repetitive text, identifies the instances of the repetitive text, and creates an ancillary file (not shown) containing the repetitive text associations. In one embodiment, the repetitive text associations are segments of text identified by a publisher to aid learning or information retention for key items. These repetitive text associations may be literal word-for-word matching segments of text. Repetitive text associations are distributed throughout text or an e-Book to facilitate learning via repetition. For example, a publisher may identify four to eight word segments of text for the repetitive text associations within electronic document 130. Alternatively, a user's preference may be that the area containing the repetitive text segment, to be highlighted, is a whole sentence or a paragraph rather than initial repetitive text segment initially defined for a repetitive text association. In this example, the user needs electronic document 130 reanalyzed by electronic document analysis application 104 to create a different ancillary file based on the user's preferences. In another embodiment, electronic document analysis application 104 hyperlinks related repetitive text segments, allowing a user to locate instances of the repetitive text segment and to check the context of the instances of the repetitive text segment. For example, the repetitive text associations within the electronic document may have metadata assignments (e.g., tags, etc.). In an example embodiment, electronic document 130 contains embedded HTML code providing tags, anchors, and id's for identifying "elements" corresponding to the repetitive text associations and a Cascade Style Sheet (CSS). The initial length of the repetitive text segment within electronic document 130 is the text associated with a tag. In this example, the user may extend the area of highlighting containing a repetitive text segment by the use of macros within a word processor to redefine the text assigned to a tag or define HTML elements associated to the tag. For example, to set a highlighting area to "sentence", a macro searches for an instance of repetitive text assigned to a tag and then searches backwards in the electronic document from the repetitive text segment for the first character after a "period+two spaces" or a special end-of-line (EOL) character and identifies that point as the beginning of an HTML element associated with the tag for a repetitive text association. A different macro searches forward in the electronic document for the next instance of a period or a special end-of-line (EOL) character and identifies the "period" as the end of the HTML element.

In a different embodiment, the user determines which repetitive text to convert into repetitive text associations via a multi-step process employing a version of electronic document analysis application 104. In an embodiment, electronic document analysis application 104 may use natural language processing (NLP) techniques to parse electronic document 130, and the user may further refine the results to identify repetitive text that is important, rather than repetitive text that is common or redundant. Subsequent to the user's analysis, a different embodiment of electronic document analysis application 104 executes to create an ancillary file containing the repetitive text associations and the length of the repetitive text segments. In an example embodiment, the repetitive text associations are contextual rather than literal. In this example, the keywords creating the repetitive text association are distributed within a larger block of text (e.g., sentence, group of sentences, paragraph, etc.). A NLP application incorporating statistical parsing may be required to analyze an electronic document using contextual repetitive text to determine the repetitive text associations.

DRM application 106 verifies if a user has the authority to update or create files associated with electronic document 130. In one embodiment, DRM application 106 determines whether the current electronic document 130 can be modified. For example, the e-Book was free because it contained links to advertisers. However, if a user acquires (e.g., buys, licenses, etc.) an "ad-free" version of the e-Book, DRM controls in the e-Book allow for modification or creation of one or more files that can identify repetitive text associations (e.g., the Cascade Style Sheet (CSS), an ancillary file containing the repetitive text associations, or additional files linked to the original document) in the e-Book.

Electronic document repository 115 may be a laptop computer, a tablet computer, a netbook computer, a personal computer (PC), a desktop computer, an electronic data storage system, or any programmable computer system known in the art. In certain embodiments, electronic document repository 115 represents a computer system utilizing clustered computers and components (e.g., database server computers, application server computers, etc.) that act as a single pool of seamless resources when accessed through network 110, as is common in data centers and with cloud computing applications. In general, electronic document repository 115 is representative of any programmable electronic device or combination of programmable electronic devices capable of executing machine readable program instructions and communicating with client computers, such as client device 120 via network 110. Electronic document repository 115 may include components as depicted and described in further detail with respect to FIG. 4, in accordance with embodiments of the present invention.

In one embodiment, electronic document repository 115, client device 120, and server 102 communicate through network 110. Network 110 can be, for example, a local area network (LAN), a telecommunications network, a wide area network (WAN) such as the Internet, or any combination of the three, and can include wired, wireless, or fiber optic connections. In general, network 110 can be any combination of connections and protocols that will support communications between electronic document repository 115, client device 120, and server 102, in accordance with embodiments of the present invention.

Electronic document repository 115 stores a plurality of electronics documents. Each document may exist as multiple copies of the same document but stored as different output formats (.pdf, .epub, etc.) which are uniquely downloaded based on the format requirements of the e-Reader, word processor, web browser, etc.

In one example embodiment, electronic document repository 115 exists as a storage device in a publisher's computing center or an on-line bookstore. In another example embodiment, electronic document repository 115 is part of a LAN system within the company that employs the user. The user's profile (not shown) and user reading time duration information (not shown) are stored on electronic document repository 115 along with an instance of electronic document 130.

Client device 120 may be, for example, a notebook, a laptop computer, a tablet computer, an e-Reader, a handheld device, a smart phone, wearable technology with an optical head-mounted display (OHMD), or any other electronic device or computing system capable of communicating with a server, such as server 102, and/or accessing electronic document repository 115 through network 110. Client device 120 may include components, as depicted and described in further detail with respect to FIG. 4.

Client device 120 includes EDP software 124, user interface (UI) 122, interface application 126, and electronic document 130. In one embodiment, client device 120 executes interface application 126 (e.g., web browser) to search for electronic document 130 on the Internet or in electronic document repository 115. In response to locating electronic document 130, interface application 126 downloads electronic document 130 to client device 120. The user then activates EDP software 124 in preparation to read electronic document 130. The user inputs the user preferences for electronic document 130 via user interface (UI) 122.

In an embodiment of the present invention, EDP software 124 includes UI 122 and two primary functions, dynamic highlighting program 200 and search routine 300. Dynamic highlighting program 200 analyzes electronic document 130 for repetitive text associations, creates mark-up files for monitoring time durations of the user for reading repetitive text segments, analyzes reading trends, and dynamically updates repetitive text segments. Based on user preferences and the display area used to read electronic document 130, dynamic highlighting program 200 determines the documents length, user's location in the document, and relative document length information. For example, the relative document length indication may be total document length adjusted by the change in speed of a user reading repetitive text segments. If dynamic highlighting program 200 does not find repetitive text association associated with electronic document 130, then EDP software 124 activates search routine 300. Search routine 300 initially searches for versions of electronic document 130 that include the repetitive text associations or an ancillary file containing the required associations. If search routine 300 does not find a fully enabled version of electronic document 130, then search routine 300 searches for the required support file(s). In one embodiment, the search starts locally and later searches the Internet. If unsuccessful, search routine 300 searches for the capability to analyze electronic document 130 and create the repetitive text associations or an ancillary file containing the required associations. Published documents may be copyright protected. Search routine 300 automatically attempts to negotiate digital rights management (DRM) issues and, if unsuccessful, search routine 300 notifies the user.

In an embodiment, EDP software 124, utilizing dynamic highlighting program 200, detects that electronic document 130 lacks repetitive text associations and informs the user via a message presented through UI 122. EDP software 124 accesses network 110 via interface application 126. Once granted access to network 110, search routine 300 searches for a version of electronic document 130 containing the repetitive text associations or if there is an ancillary or "plug-in" file containing the repetitive text associations for electronic document 130. If the search fails, search routine 300 notifies the user.

In another embodiment, EDP software 124 determines that there are no repetitive text associations available in electronic document 130. EDP software 124, utilizing search routine 300, searches for third-party software to extract repetitive text associations for electronic document 130. For example, server 102 may host an on-line program or an e-publishing organization may offer file conversion and analysis services (e.g., electronic document analysis application 104). However, electronic document 130 may be a "read-only" file or protected in some other manner. In one embodiment, DRM application 106 determines the properties of electronic document 130 and advises the user via EDP software 124 or interface application 126. For example, DRM application 106 determines that electronic document 130 is restricted but not read-only, and the user may need to buy a license from the publisher of electronic document 130 to modify electronic document 130. Similarly, the e-publishing organization, offering electronic document analysis application 104, may charge the user a fee to negotiate the DRM and convert electronic document 130. In some embodiments, EDP software 124 handles the interactions for the automatic conversion of electronic document 130. For example, the user's company has contracts with publishers to provide products and services on a yearly basis. In other embodiments, EDP software 124 may need manual intervention by the user to handle instances when an electronic document does not have repetitive associations available.

Figure 2:
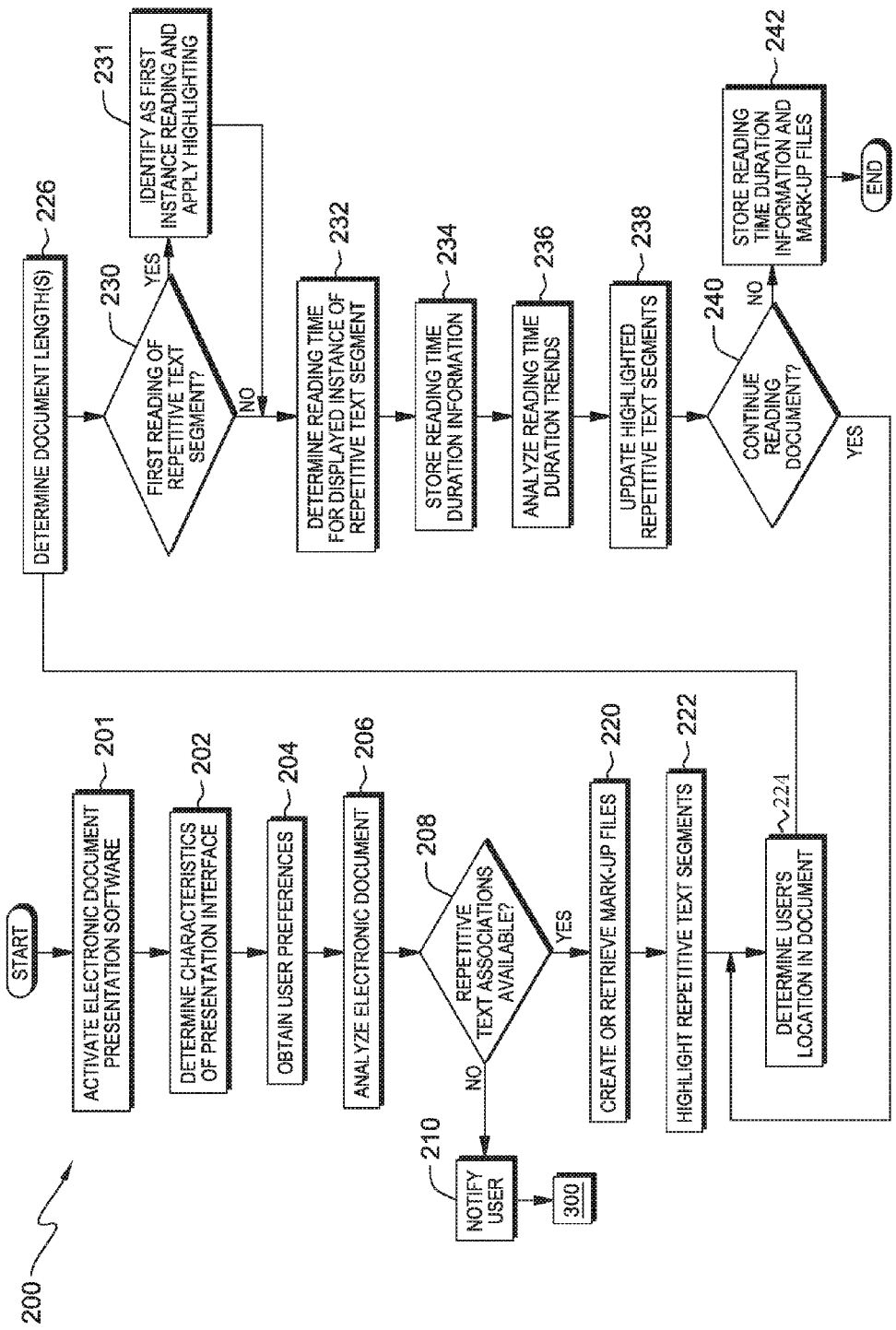
FIG. 2 is a flowchart depicting operational steps of a program for providing dynamic highlighting of repetitive text segments in an electronic document, in accordance with an embodiment of the present invention.

FIG. 2 is a flowchart depicting operational steps of dynamic highlighting program 200, a function of EDP software 124, for monitoring the reading of electronic document 130 by a user and highlighting repetitive text. As the user reads repetitive text within electronic document 130, dynamic highlighting program 200 dynamically updates the highlighting of unread segments of repetitive text based on the time spent by the user reading previous segments of the same repetitive test. Dynamic highlighting program 200 executes on client device 120 and has access to additional resources within the environment of FIG. 1 via network 110.

In step 201, the user activates dynamic highlighting program 200 via UI 122. In one embodiment, EDP software 124 activates in response to a user identifying, via UI 122, that electronic document 130 contains repetitive text associations rather than activating a native e-Reading application (not shown). In an example embodiment, UI 122 has file browsing capability, and electronic documents listed in green characters are electronic documents containing repetitive text associations. If the user selects an electronic document listed in green characters, dynamic highlighting program 200 activates. In another embodiment, the main routine of EDP software 124 "sleeps" (becomes inactive) while search routine 300 searches network 110 or the Internet to locate repetitive text association data for electronic document 130 or the capability to create the repetitive text association data. In response to successfully locating repetitive text associations (e.g., ancillary files, etc.) for electronic document 130, EDP software 124 reactivates and processes electronic document 130 through dynamic highlighting program 200.

In another embodiment, dynamic highlighting program 200 determines that the user is presenting electronic document 130 in an audiobook mode. For example, the user presents electronic document 130 normally, however; the user has a screen reader (not shown) active to convert the text to speech. Alternatively, dynamic highlighting program 200 determines if electronic document 130 is formatted as an audio or audiovisual file (e.g., mpeg, mpeg-4, AVI, etc.) with embedded cuing information (e.g., chapter identifiers, repetitive text flags, etc.) or a second file synchronized to the audio.

In step 202, dynamic highlighting program 200 determines the characteristics of the presentation interface used by client device 120 to present electronic document 130 to the user (e.g., color or monochrome, full screen or within a browser window, size of the presentation area). For example, a wearable electronic device has a physically small display, however; the display is high resolution and is very close to the user's eyes rendering a larger presentation area (e.g., equivalent to a tablet computer's display area). In one embodiment, electronic document 130 is an e-Book (e.g., the text is reflowable) so the page count calculations are dependent on the determined attributes of the presentation interface and user preferences related to presenting electronic document 130.

In another embodiment, dynamic highlighting program 200 determines that the user is presenting electronic document 130 in an audiobook mode. If the user employs a screen reader, then dynamic highlighting program 200 can determine page count normally.

In step 204, dynamic highlighting program 200 obtains the user preferences. In an example embodiment, dynamic highlighting program 200 obtains user preferences that relate to the reading of electronic document 130, presentation setting (e.g., font size, margin settings, display area, etc.), repetitive text preferences (e.g., highlighting color(s), gradient vs. solid, section specific color assignments), the area of the highlighted text segments (e.g., repetitive text only, sentence or paragraph containing the repetitive text segment, etc.), hyperlinks related to repetitive text associations, user profile information, etc. In one embodiment, a user inputs preferences via UI 122 before allowing dynamic highlighting program 200 to proceed. In another embodiment, dynamic highlighting program 200 analyzes electronic document 130 (in step 206) and prompts the user via UI 122 to input information for undefined fields or accept default values. For example, electronic document 130 was published in HTML and includes tags related to important information; however, information other than repetitive text associations is "tagged." The user employs UI 122 to identify which tagged items to ignore and which tagged items to highlight. Since electronic document 130 was published in HTML code, the user may be able to browse repetitive text associations and refine the highlighting by regrouping contextually related repetitive text segments together. Other preferences or presets that dynamic highlighting program 200 can determine from electronic document 130 may include font, font color, audiovisual content displays in a separate window, etc. In another embodiment, the user is listening to electronic document 130 (e.g., audiobook). For example, the user may specify audio cues (e.g., tones, music, verbal identifiers, etc.) to identify repetitive text associations and a cue modifier (e.g., loudness, speed, verbal numerical identification, etc.) to substitute for the change in highlighting of a repetitive text segment. In another example, the audio cues are predefined spoke phrases (e.g., "first instance of concept one", "fourth instance of API programming example", etc.). In another example, dynamic highlighting program 200 determines the user's interaction method for the audiobook presentation of electronic document 130 (e.g., voice recognition commands, touch screen activation, etc.).

In step 206, dynamic highlighting program 200 analyzes electronic document 130. The primary information that dynamic highlighting program 200 utilizes to produce dynamic highlighting is the availability of repetitive text associations and the initial length of the repetitive text segments. In another embodiment, dynamic highlighting program 200 determines from the analysis of electronic document 130, which obtained user preferences (in step 204) are incorporated in subsequent steps. For example, a user's preferences may indicate that the length of the highlighted area of a repetitive text segment within electronic document 130 is expanded to encompass the sentence containing the repetitive text segment if the repetitive text segment is contiguous. In another example, if the repetitive text associations are contextual rather than contiguous text segments, a user's preference may be to highlight the paragraph. In the case of an HTML based electronic document 130, the HTML code within the document can define the area or block of text corresponding to an instance of a repetitive text association. In another embodiment, dynamic highlighting program 200 modifies the analysis of electronic document 130 to present electronic document 130 via an electronic speech synthesizer. For example, each repetitive text association is assigned a different synthesized voice.

In step 208, dynamic highlighting program 200 determines whether repetitive text associations are available. If analysis of electronic document 130 determines that no repetitive text associations are available (no branch, decision 208), then dynamic highlighting program 200 notifies the user (step 210). In an embodiment, if the analysis determines that electronic document 130 does not contain repetitive text associations, the user preferences are queried for preferred search location to start within step 302 of FIG. 3.

In step 210, dynamic highlighting program 200 advises the user that repetitive text associations are not incorporated within electronic document 130. In an embodiment, a user may respond via UI 122 to allow search routine 300 to automatically search for the needed information. In another embodiment, the user terminates EDP software 124 because a different version of electronic document 130 needs to be acquired (e.g., bought, licensed, etc.), downloaded, and decompressed. For example, the different version of electronic document 130 that is downloaded is a "zip" file (.zip is an archive file format that supports lossless data compression). Client device 120 does not have an "unzip" program installed so the decompression of electronic document 130 occurs on a different electronic device (not shown), and the decompressed electronic document 130 is transferred to client device 120.

If in step 208 dynamic highlighting program 200 determines that repetitive text associations are available (yes branch, decision 208), then dynamic highlighting program 200 prepares one or more files to track the user's reading of electronic document 130.

In step 220, dynamic highlighting program 200 creates "mark-up" files for subsequent use and updating as a user reads electronic document 130. Alternatively, dynamic highlighting program 200 retrieves the mark-up files for a previously read instance of electronic document 130. In one embodiment, dynamic highlighting program 200 creates a file for each repetitive text association. For example, the structure for a repetitive text association mark-up file is .csv file format (comma separated value) where each line represents: a repetitive text occurrence, a sequence in the document, the sequence read by the user, a time and date stamp (e.g., timestamp), the time duration expended by the user reading the repetitive text segment, the highlighting scheme, the current highlighting, the highlighting based on the calculated reading trend, a user ID, etc., and/or the contextual grouping of unique text strings. In another embodiment, electronic document 130 has been partially read by a user, and dynamic highlighting program 200 retrieves the mark-up files from a storage location (e.g., stored at step 242 during the partial reading). For example, the mark-up files may reside on client device 120 or the mark-up files may exist on an intranet accessible via network 110. Electronic document 130 may be a textbook and the user a student, wherein both the user and the user's teacher can track the progress of reading electronic document 130. In yet another embodiment, the mark-up files may exist as a single file with each repetitive text segment a section (e.g., a database, etc.).

In step 222, dynamic highlighting program 200 applies highlighting to the repetitive text segments. In an example embodiment where electronic document 130 is unread, dynamic highlighting program 200 applies initial highlighting based on the user preferences obtained in step 204 to the mark-up files. In another example embodiment where electronic document 130 has been partially read, dynamic highlighting program 200 applies highlighting to the repetitive text based on information in the mark-up files. In a further embodiment, dynamic highlighting program 200 employs a retention degradation function (not shown) to compensate for a user's "rate of forgetting." Alternatively, if electronic document 130 has embedded tests to quiz the user on the anticipated learning associated with the repetitive text, dynamic highlighting program 200 employs the retention degradation function to adjust the dynamic highlighting based on the "degree of learning" determined for one or more repetitive text associations. Dynamic highlighting program 200 analyzes one or more deviations between the current timestamp, and the timestamps for the stored reading time duration information and mark-up files for the user reading or rereading electronic document 130. Dynamic highlighting program 200 can reset the dynamic highlighting in electronic document 130 if the retention degradation function determines that a predefined time duration passed between the user's readings of electronic document 130. Dynamic highlighting program 200 can change the dynamic highlighting proportionally in response to the retention degradation function (not shown) analysis of lesser time duration deviations. In some embodiments, dynamic highlighting program 200 may advise the user that the retention degradation function may modify the dynamic highlighting for electronic document 130 and allow user intervention.

In another embodiment, dynamic highlighting program 200 replaces the highlighting with audio cues when electronic document is listened to rather than read (e.g., an audiobook, a screen reader, a voice synthesizer, etc.).

In step 224, dynamic highlighting program 200 determines the user's current location within electronic document 130. In an embodiment, EDP software 124 presents electronic document 130 directly, and dynamic highlighting program 200 accesses information for electronic document 130 continuously, relative to the entire document for any text and to the sequence for a repetitive text segment if a repetitive text segment is presented. In another embodiment, interface application 126 (e.g., a web browser) displays electronic document 130. For example, dynamic highlighting program 200 monitors interface application 126 identifying the user's location within electronic document 130 and watches for metadata tags as the user reads to identify repetitive text segments and the associated occurrence number for the identified repetitive text. If the user reads non-linearly, dynamic highlighting program 200 sets "cookies" (a small piece of data saved to monitor the user's previous activity) identifying the instances of repetitive text the user has read. The cookies may be used in conjunction with the tags to relate the user's reading behavior to the appropriate mark-up file.

In step 226, dynamic highlighting program 200 determines one or more document lengths. In an example embodiment, dynamic highlighting program 200 determines one or more page lengths of electronic document 130 based on user preferences, active display area on client device 120, the format of electronic document 130, repetitive text reading time durations, and repetitive text segment length. In one embodiment, electronic document 130 is a "fixed format" file type (e.g., .pdf, etc.), and the total document length is a fixed value. Dynamic highlighting program 200 determines a relative document length, or remaining number of pages, based on the amount of non-repetitive text and a proportion of the repetitive text in electronic document 130. An example of one page count structure is current/total[relative] (e.g., 40 of 200[195]). For example, the total page count (e.g., 200) is the length of electronic document 130, as displayed for a particular client device 120. The relative document length for electronic document 130, as displayed for a particular client device 120, is the total page count reduced by a portion of the page count attributed to repetitive text segments. The effective portion of a page is a variable effect based on the speed the user reads repetitive text segments. In another example, at the beginning of electronic document 130 skimming of repetitive text instances has not occurred so the relative number of remaining pages is the same as the actual number of remaining pages. In a different example, as the user progresses through the electronic document 130, the highlighting changes to indicate that the user has started skimming one or more repetitive text associations. Dynamic highlighting program 200 detects that the user is spending less time reading a repetitive text association, the relative page length value for the remaining repetitive text segments corresponding to the repetitive text association is reduced, thereby decreasing the relative total page count. Alternatively, if the user found a segment of repetitive text and took more time to read the segment the relative total page count could increase.

In another embodiment, electronic document 130 is formatted as reflowable text. The total document length could vary at each reading. For example, if the user started reading electronic document 130 on a PC with a monitor, the total page count could be 100 pages, on a tablet PC the total page count for electronic document 130 could change to 400 pages, and a smartphone may indicate the total page length for electronic document 130 is 800 pages. In one embodiment, a similar effect may be seen with the relative page count. For example, on a smartphone, a repetitive text segment for electronic document 130 may be the size of a page so if dynamic highlighting program 200 determines that a repetitive text segment is being skimmed, the relative page count decreases by the number of remaining instances of the repetitive text segment. Whereas the same repetitive text segment of electronic document 130 read on a PC monitor may comprise 10% of a page, so if less than ten instances of the repetitive text remain in the unread portion of electronic document 130, dynamic highlighting program 200 may display no effect on the relative page count. However, if a user preference sets a relative page length threshold for the combined length of the remaining repetitive text segments (e.g., no page reduction for <60% combined page length), then dynamic highlighting program 200 may display a reduction in relative page length. In another embodiment, the relative page lengths of the remaining repetitive text segments for each repetitive text association of electronic document 130 are combined for determining the relative remaining page length.

In another embodiment, dynamic highlighting program 200 is responding electronic document 130 presented as an audiobook where page lengths may be variable. For example, text can run over from one page to another. However, a page break is awkward in the spoken word. The end of a "page" in an audiobook may be at the end of, a sentence, a paragraph, a concept, etc.

In step 230, dynamic highlighting program 200 determines whether a current repetitive text segment presented to a user is the first occurrence of that text segment read by the user. If dynamic highlighting program 200 determines that a current repetitive text segment presented to the user is the first occurrence read by the user (yes branch, decision 230), then dynamic highlighting program 200 identifies the occurrence of the repetitive text segment is identified as the "first instance reading" (step 231). In one embodiment, dynamic highlighting program 200 updates the mark-up file for the repetitive text segment with the current occurrence flagged as the first reading.

In step 231, dynamic highlighting program 200 applies the "first instance reading" highlighting to the current repetitive text segment presented to the user. In an embodiment, dynamic highlighting program 200 highlights or identifies the current repetitive text segment being presented to the user, as defined by a scheme set in the user's preferences. If no user preference is set for the initial reading for an instance of a text segment, dynamic highlighting program 200 applies the system default. For example, the current repetitive text segment is the initial reading instance. Dynamic highlighting program 200 applies the user's "initial instance scheme" of "bold square brackets with underlining" around the repetitive text segment and applies the color of the highlighting set for that repetitive text segment.

If dynamic highlighting program 200 determines that a current repetitive text segment presented to the user is not the first occurrence read by the user (no branch, decision 230), then dynamic highlighting program 200 highlights the occurrence of the repetitive text segment based on other information. In one embodiment, the user has previously read a portion of electronic document 130 and returns to read more of electronic document 130. Dynamic highlighting program 200 highlights the current repetitive text segment corresponding to the highlighting applied at step 222. In another embodiment, the user arrives at another instance of repetitive text, and dynamic highlighting program 200 displays the highlighting for this instance based on the highlighting set in a previous occurrence of step 238. For example, the user arrives at the fourth occurrence of a segment of repetitive text. The user preference for adjusting highlighting is the average of the time durations of the previous of three occurrences so dynamic highlighting program 200 presents the user a third change in highlighting (e.g., initial reading instance, default highlighting for second and third occurrence, a change based on a three reading time duration average).

In step 232, dynamic highlighting program 200 determines the time duration of the reading time taken by the user for the current instance of a repetitive text segment. In one embodiment, dynamic highlighting program 200 determines the time duration based on detecting scrolling activity from the user, starting from when the beginning of the repetitive text segment is displayed to the user until the repetitive text segment scrolls off the page. For example, on a smartphone a repetitive text segment is a full page. In another embodiment, the user signals to EDP software 124 the start of reading a repetitive segment and a signal identifying the end of reading the repetitive text segment. For example, the signals may be hot-keys, finger taps, stylus movements, etc. In yet another embodiment, if client device 120 has a camera and eye motion-scanning capability, such an embodiment may be used for a disabled user or users that prefer hands-free interactions. Gaze tracking hardware and software (not shown) provides the user the ability to customize the area of the display device to exclude from interactions and the areas of the display device that react to the user's eye movements (e.g., set scroll areas, emulate mouse clicks, activate on screen visual keyboard, etc.). Gaze tracking is available for personal computers, laptops, tablet computers, wearable devices, etc. In a different embodiment, the user preference activates an additional repetitive text identification feature, "user comment". For example, if the user circles the repetitive text segment with a stylus, a pop-up window appears allowing the user to add a comment to the repetitive text segment (e.g., this instance, all instances, etc.). If, for example, the user marks the repetitive text segment with the stylus in the shape of an "X", the user is signifying to highlight this repetitive text segment in the future as "skip" (e.g., the final level of highlighting). In yet another example, if the user moves the stylus in the shape of a "check mark" the highlighting stays fixed; a double check mark indicates highlight for emphasis. Similarly, a user employing gaze tracking or voice recognition may be able to define interactions that would mimic the use of a stylus in the proceeding examples.

In step 234, dynamic highlighting program 200 stores the reading time duration of the repetitive text segment. In an example embodiment, dynamic highlighting program 200 adds or updates the reading time duration information for the current repetitive text segment to the mark-up file associated with the repetitive text segment. In one embodiment, the reading time durations for the repetitive text segment within electronic document 130 is cached in local memory on client device 120. In another embodiment, client device 120 contains one or more forms of persistent storage (e.g., a hard drive, a flash memory card, etc.). The types of information stored include reading durations, repetitive text segment reading sequence, user comments (text based), user comments (physical indications, e.g., stylus marks across the highlighted repetitive text segment), user ID, etc.

In another embodiment, the e-Reader (i.e., client device 120) may not have enough memory to store all the content related to electronic document 130. For example, client device 120 is connected to the publisher of electronic document 130 via a Wi-Fi connection to network 110 and subsequently the publisher (e.g., electronic document repository 115). Client device 120 only holds a portion of electronic document 130 in memory so the publisher maintains the user's reading information and transmits additional content for electronic document 130 as needed and deleting previously read content to free up memory on client device 120.

In step 236, dynamic highlighting program 200 analyzes the reading time duration trends. In an example embodiment, dynamic highlighting program 200 reviews the user preferences and analyzes reading time trends (e.g., average of the previous three reading time durations of the repetitive text segment) and/or thresholds for changing to the next highlighting level (e.g., greater than 10 seconds is solid, 5 to 10 seconds is 60% gradient, 2 to 4.9 seconds is 30% gradient, less than 2 seconds is underline). In one embodiment, highlighting levels use the same rules for each occurrence. In a different embodiment, the thresholds for changing highlighting may adjust based on the length of the repetitive text segment.

In step 238, dynamic highlighting program 200 updates the highlighting for the next occurrence of the repetitive text segment. In an example embodiment, dynamic highlighting program 200 updates the highlighting for the next occurrence of the repetitive text segment based on the analysis of reading time trends (from step 236). In one embodiment, the user preference is non-linear reading so each remaining instance of the repetitive text segment has the same highlighting applied. Subsequent changes to highlighting are based on the reading time duration of the current instance and applying the reading trend analysis. In another embodiment, the user was initially reading a linear fashion. Dynamic highlighting program 200 highlights the next sequential instance of the repetitive text segment based on a reading time trend. However, the user jumps to a different location within electronic document 130 that contains the repetitive text segment. Dynamic highlighting program 200 detects the reading sequence change for the repetitive text segment and the assigns the highlighting for expected next instance of the repetitive text segment to the current instance of the repetitive text segment. In another embodiment, where a user is listening to electronic document 130 (e.g., audiobook), dynamic highlighting program 200 adjusts the audio cues in response to the reading duration trend for a repetitive text association. For example, the spoken instance number, loudness of the cue tone, etc. changes, based on the user preferences, for subsequent instances of repetitive text segments identified with a repetitive text association.

In step 240, dynamic highlighting program 200 determines whether the user continues to read electronic document 130. If dynamic highlighting program 200 detects that the user is still reading electronic document 130 (yes branch, decision 240), then dynamic highlighting program 200 determines the user's current location (step 224). In one example embodiment, the user reads normally (e.g., sequentially, not jumping between sections). In this example, steps 230 through 238 are inactive until the user reads a subsequent occurrence of any repetitive text segment within electronic document 130. Dynamic highlighting program 200 continues to monitor the users location within electronic document 130 (step 224), determines the document length(s), and displays the document length(s) on an ongoing basis (step 226).

If dynamic highlighting program 200 either detects that the user stopped reading electronic document 130 or has reached the end of electronic document 130 (no branch decision 240), then the reading time duration information and mark-up files are stored (step 242). For example, the user has reached the end of electronic document 130 or the user indicated to dynamic highlighting program 200 that the user is finished reading electronic document 130 (e.g., switching to another e-Book, terminating EDP software 124 prior to powering off client device 120, etc.). In one embodiment, client device 120 is the user's personal device and electronic document 130 is not shared with other users, so the reading time duration information and mark-up files are stored locally on client device 120. In another embodiment, electronic document 130 is being studied collaboratively, and the reading time duration information and mark-up files are stored, for example, on a company's intranet accessible via network 110 under the user's profile assigned to electronic document 130.

Figure 3:
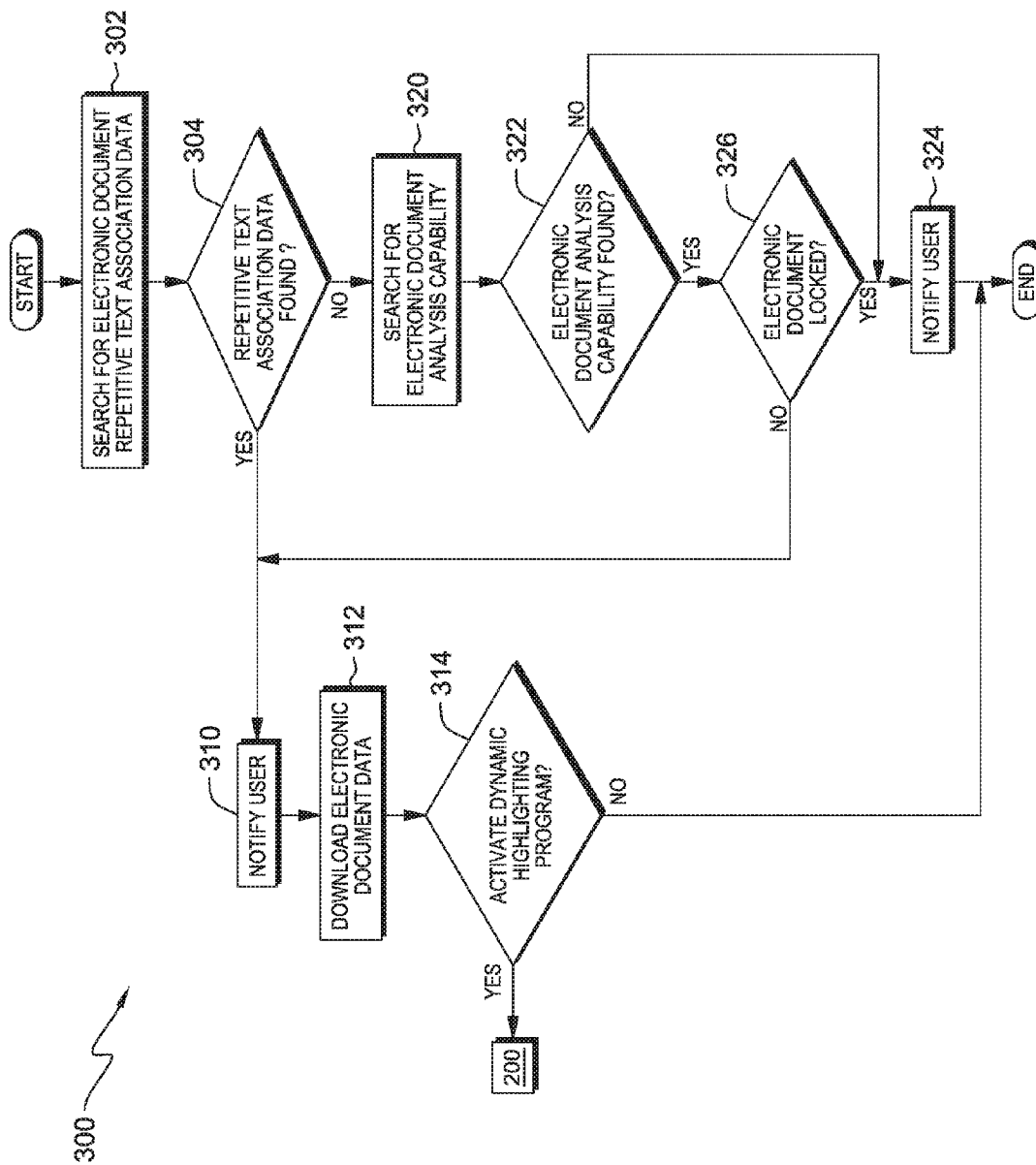
FIG. 3 is a flowchart depicting operational steps of a program for acquiring repetitive text association data within the distributed computing environment of FIG. 1, in accordance with an embodiment of the present invention.

FIG. 3 is a flowchart depicting operational steps of search routine 300, a function of EDP software 124, for acquiring repetitive text association data, in accordance to an embodiment of the present invention. Communications to locate the files or services can be by, but not limited to, LAN, WAN, Bluetooth, or wireless.

In step 302, search routine 300 searches for a file associated with electronic document 130 that includes repetitive text association data. In one embodiment, search routine 300 searches for an instance of electronic document 130 that contains the repetitive text associations or an ancillary file for electronic document 130 containing the repetitive text associations. In an example embodiment, search routine 300 searches client device 120, and if the required data is unavailable, search routine 300 searches other electronic devices and locations connected to network 110 to locate an instance of electronic document 130 containing the repetitive text associations.

In one embodiment, search routine 300 searches electronic document repository 115 for a version of electronic document 130 that contains the repetitive text associations. In another embodiment, search routine 300 searches the computer system of the publisher of electronic document 130 for the ancillary file containing the repetitive text associations for electronic document 130. In a different embodiment, search routine 300 searches the Internet to locate a pre-existing ancillary file containing the repetitive text associations for electronic document 130 that a different user may have uploaded to a server or website.

In decision step 304, search routine 300 determines whether a file containing text association data corresponding to electronic document 130 has been found. If search routine 300 finds a version of electronic document 130 containing the repetitive text associations or the ancillary file containing the repetitive text associations (yes branch, decision 304), then search routine 300 notifies the user (step 310).

In step 310, search routine 300 presents the user with notifications via UI 122. In example embodiments, search routine 300 presents the user with notifications that may be informational or advisements that may request the user's intervention.

In one embodiment, there is no fee to obtain the data for electronic document 130, and the user notification is informational (step 310). In another embodiment, if the payment of a fee or other interaction that requests direct intervention by the user occurs, search routine 300 presents a message received from the search or presents a predetermined message governing the situation to the user (step 310). Search routine 300 can pause and await response from the user. The user indicates, via UI 122, how search routine 300 is to proceed.

In response to a search that allows search routine 300 direct access to a version of electronic document 130 containing the repetitive text associations or the ancillary file containing the repetitive text associations, search routine 300 downloads the electronic document data to the directory location accessible by client device 120 or EDP software 124 (step 312).

In step 312, search routine 300 may pause awaiting a response from the user. In this example embodiment, the user signs in to the publisher's website and downloads a compressed version of electronic document 130. In this example, the user executes interface application 126 (e.g., a web browser) to sign in to the publisher's website, downloads the compressed version of electronic document 130, and decompresses electronic document 130 to the proper directory location for access by dynamic highlighting program 200.

In decision step 314, search routine 300 determines whether to activate dynamic highlighting program 200. If user preferences or an indication from the user via UI 122 instruct search routine 300 not to process the repetitive text associations for electronic document 130 (no branch, decision 314), the current instance of search routine 300 and EDP software 124 ends. For example, the compressed version of electronic document 130 cannot be decompressed using any options within interface application 126. The user indicates via UI 122 for EDP software 124 to terminate, which permits the user to use a different feature or application on client device 120 to decompress the file for electronic document 130.

Alternatively, if the repetitive text associations for electronic document 130 are available in a directory which search routine 300 can access, then search routine 300 passes electronic document 130 to dynamic highlighting program 200 for processing (yes branch, decision 314).

Looking back to decision 304, if search routine 300 does not find a version of electronic document 130 containing the repetitive text associations or the ancillary file containing the repetitive text associations (no branch, decision 304), then search routine 300 searches the Internet for the capability to analyze electronic document 130 and create the ancillary file containing the repetitive text associations for electronic document 130 or to create a version of electronic document 130 which EDP software 124 can process (step 320).

If search routine 300 does not find the capability to analyze electronic documents for repetitive text associations (no branch, step 322), then search routine 300 notifies the user that electronic document analysis capability was not found (step 324).

In one embodiment, in step 324, search routine 300 pauses, awaiting the user's response via UI 122. For example, the user may decide to search the Internet to find the needed electronic document analysis capability and copy the URL for the website with the needed electronic document analysis capability. The user may then input the URL via UI 122 to search routine 300. Search routine 300 then resets decision 322 to the yes branch and continues the process of obtaining the ancillary file containing the repetitive text associations for electronic document 130 or creating a version of electronic document 130 which dynamic highlighting program 200 can process. In another embodiment, the user preference is to end EDP program 124 after notifying the user.

Alternatively, if search routine 300 finds electronic document analysis capability (yes branch, decision 322), then search routine 300 determines whether electronic document 130 is locked (decision step 326). For example, search routine 300 locates an e-publishing organization that uses server 102. Server 102 contains electronic document analysis application 104, which can extract the repetitive text associations and format the repetitive text associations into an ancillary file for electronic document 130.

If search routine 300 determines that electronic document 130 is "locked" (e.g., read-only) or is advised by DRM application 106 executing on server 102 that electronic document 130 cannot be analyzed (yes branch, decision 326), then search routine 300 notifies the user (step 324). In one embodiment, search routine 300 provides the user with information determined by DRM application 106. The user may base subsequent actions on the content of the information. For example, the information provided by DRM application 106 executing on server 102 identifies that electronic document 130 was "free" because it contains links to advertisers and is read-only; however, if the user pays for an ad-free version of the electronic document 130, the DRM controls allow for creation of the ancillary file containing the repetitive text associations (yes branch, decision 326).

If electronic document 130 is not locked (no branch, decision 326), search routine 300 notifies the user that electronic document analysis application 104 can analyze electronic document 130. In one embodiment, the creation of the ancillary file containing the repetitive text associations proceeds automatically. In another embodiment, the user pays a fee to analyze electronic document 130 and obtain the ancillary file for electronic document 130 using electronic document analysis application 104 executing on server 102.

Figure 4:
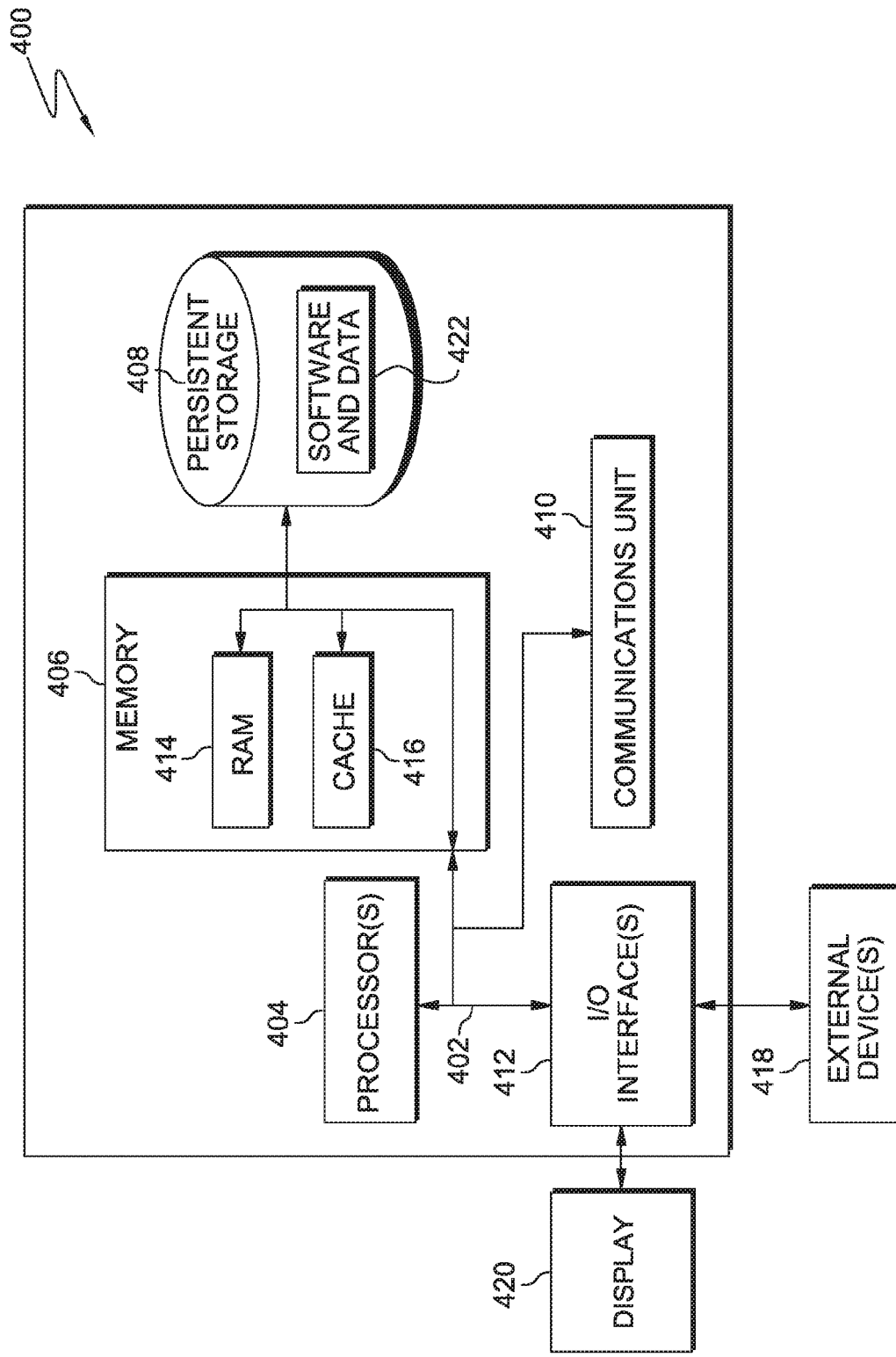
FIG. 4 depicts a block diagram of components of a computing system representative of the client device and server of FIG. 1, in accordance with an embodiment of the present invention.

FIG. 4 depicts a block diagram of components of computer 400, which is representative of server 102, electronic document repository 115, and client device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processors 404 via one or more memories of memory 406. With respect to client device 120, software and data 422 includes EDP software 124, user interface (UI) 122, interface application 126, electronic document 130, dynamic highlighting program 200, and search routine 300. With respect to server 102, software and data 422 includes electronic document analysis application 104 and DRM application 106. With respect to electronic document repository 115, software and data 422 includes electronic document 130.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server 102, network 110, electronic document repository 115, and client computer 120. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data 422 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically highlighting repetitive text in electronic documents, the method comprising:
    obtaining, by one or more computer processors, one or more user preferences related to a user reading an electronic document;
    determining, by one or more computer processors, whether the electronic document contains one or more repetitive text associations, wherein a repetitive text association is data that provides one or more indications of repetitive text segments interspersed within a document;
    in response to determining that the electronic document contains one or more repetitive text associations, identifying, by one or more computer processors, one or more repetitive text segments in the electronic document corresponding to the one or more repetitive text associations;

determining, by one or more computer processors, a time duration expended by the user reading an instance of the identified one or more repetitive text segments within the electronic document, wherein determining a time duration expended by the user reading an instance of the identified one or more repetitive text segments within the electronic document comprises:
  determining, by one or more computer processors, that a location of the user within the electronic document is at a location of one of the identified one or more repetitive text segments;
  storing, by one or more computer processors, a time duration; wherein the stored time duration includes one or more of:
  a time duration expended by the user reading the instance of the identified one or more repetitive text segments;
  a timestamp; and
  the location of the instance of the identified one or more repetitive text segments; and
  determining, by one or more computer processors, one or more trends related to the user reading one or more instances of the identified one or more repetitive text segments corresponding to the repetitive text association based on one or more of:
    one or more obtained user preferences related to analyzing stored time durations for the repetitive text association;
    one or more default preferences associated with the electronic document; and
    a sequence in which the user read the one or more instances of the identified one or more repetitive text corresponding to the repetitive text association;

highlighting, by one or more computer processors, the identified one or more repetitive text segments within the electronic document based one or more obtained user preferences and one or more subsequent instances of the identified repetitive text segments corresponding to the repetitive text association within the electronic document based on one or more of:
  one or more obtained user preferences associated with highlighting repetitive text associations within the electronic document;
  one or more default preferences associated with the electronic document;
  one or more determined trends associated with stored time durations corresponding to the repetitive text association; and
  the sequence in which the one or more subsequent instances of the identified one or more repetitive text segments is read by the user; and determining, by one or more computer processors, that the user has previously read the electronic document;

retrieving, by one or more computer processors, stored time duration information for one or more repetitive text associations of the previously read electronic document, by the user;

determining, by one or more computer processors, a current time stamp;

determining, by one or more computer processors, one or more time duration deviations between the current time stamp and the retrieved time duration information for one or more repetitive text associations of the previously read electronic document by the user; and adjusting, by one or more computer processors, the highlighting of the identified one or more repetitive text segments corresponding to the one or more repetitive text associations based on the determined one or more time duration deviations.

\* \* \* \* \*